United States Patent [19]

Nishigaki et al.

[11] Patent Number: 4,564,646
[45] Date of Patent: Jan. 14, 1986

[54] LIGHT- AND THERMOSETTING RESIN COMPOSITION AND INSULATED ELECTRICAL MACHINERY AND APPLIANCES USING THE SAME

[75] Inventors: Hisashi Nishigaki; Yuji Aimono, both of Hitachi, Japan

[73] Assignee: Hitachi Chemical Company, Ltd., Tokyo, Japan

[21] Appl. No.: 580,710

[22] Filed: Feb. 16, 1984

Related U.S. Application Data

[63] Continuation of Ser. No. 337,179, Jan. 5, 1982, abandoned.

[30] Foreign Application Priority Data

Jan. 10, 1981 [JP] Japan .................................. 56-2515
Mar. 11, 1981 [JP] Japan .................................. 56-35637

[51] Int. Cl.$^4$ .......................... C08F 2/50; C08L 63/10
[52] U.S. Cl. ........................................ 522/13; 522/20; 522/14; 522/103; 525/922; 525/531

[58] Field of Search ................... 204/159.19; 525/922, 525/531

[56] References Cited

U.S. PATENT DOCUMENTS 3,709,866  1/1973  Waller ............................. 204/159.23
4,222,835  9/1980  Dixon ............................. 204/159.15

Primary Examiner—John C. Bleutge
Assistant Examiner—A. H. Koeckert
Attorney, Agent, or Firm—Antonelli, Terry & Wands

[57] ABSTRACT

A light- and thermosetting resin composition comprising (a) an unsaturated epoxy ester having a resin acid value of 5 or less, or a reaction product having a resin acid value of 5 or less obtained by reacting an unsaturated epoxy ester having a resin acid value of more than 5 with a monoepoxide, (b) one or more $\alpha,\beta$-unsaturated ethylenic monomers, and (c) one or more photosensitizers and peroxides can produce insulated electrical machinery and appliances improved in reliance and performance in a short treating time.

13 Claims, 3 Drawing Figures

LIGHT- AND THERMOSETTING RESIN COMPOSITION AND INSULATED ELECTRICAL MACHINERY AND APPLIANCES USING THE SAME

This is a continuation of application Ser. No. 337,179, filed Jan. 5, 1982, now abandoned.

BACKGROUND OF THE INVENTION

This invention relates to a light- and thermosetting resin composition and a process for producing an insulated electrical machinery or appliance by using such resin composition. More particularly, it relates to a light- and thermosetting resin composition which is suited for insulation and secure fixing of the electrical machinery and appliances and which can provide the machinery and appliances with excellent compatibility with enameled copper wires, particularly those using as coating material such resins as polyester (polyester-coated wire, hereinafter referred to as PEW), polyesterimide (polyesterimide-coated wire, hereinafter referred to as EIW) or urethane (urethane-coated wire, hereinafter referred to as UEW), and is also capable of improving the reliability and performance of the electrical machinery and appliances and shortening the time required for the insulation treatment of such machinery and appliances. It is also envisaged in this invention to provide a process for producing electrical machinery and appliances by using such resin composition.

There has been seen lately a marked tendency toward smaller size and lighter weight, intensification of the use conditions and improvement of reliability of the electrical machinery and appliances, and such tendency has given rise to a request for the improvements of adhesive strength and crack, heat and chemical resistance of insulating varnish used for such machinery and appliances as well as shortening of the treating time with such insulating varnish from the standpoint of productivity. In order to meet such requirement, unsaturated polyester resins, which are excellent in said properties, have been used in place of the conventional solvent type varnish, and further unsaturated epoxy ester resins obtained by reacting polyepoxide with an $\alpha,\beta$-unsaturated monobasic acid, which are even more excellent than said unsaturated polyester resins in adhesive strength, crack and chemical resistance, etc., have been used as insulating varnish for rotary machinery and appliances such as stator, armature and the like.

A high operational reliability is required for the rotary machinery and appliances, and the insulating varnish applied thereof is required to have good compatibility with the enameled wires used in such machinery. The conventional unsaturated epoxy ester resins have usually a resin acid value of about 10 to 20, and among the insulating varnishes prepared by dissolving such unsaturated epoxy ester resins in an $\alpha,\beta$-unsaturated ethylenic monomer, there were those which would cause peel-off or swelling of the coating during heat-curing, particularly when their solvent resistance was poor or when using PEW, EIW or UEW with improper baking, resulting in unsatisfactory electrical insulation. Also, when a metallic soap such as cobalt naphthenate, cobalt octenoate, manganese naphthenate, lead naphthenate or the like is added as curing accelerator in such insulating varnish, there would be produced a precipitate as time passes. Further, a relatively long time is required for the insulating treatment of the rotary machinery and appliances with these insulating varnishes as such treatment usually necessitates heat-curing at 100° to 150° C. for 2 to 5 hours. Moreover, in the prior art, the cross-linking monomer would volatilize away in the course of heat-curing. Thus, a better insulation treating method has been required from the viewpoint of saving of material and prevention of pollution, too.

SUMMARY OF THE INVENTION

An object of this invention is to provide a light- and thermosetting resin composition which is suited for improving the said disadvantageous points of the prior art by coating an electrical machine or appliance such as motor stator, armature, etc., with said resin composition by an impregnation treatment, then irradiating the coating surface with light to effect curing thereof and further subjecting it to a heating treatment by means of hot air, electric current, high frequency, far infrared rays, etc. Another object of this invention is to provide a process for producing an electrical machinery or appliance treated with an insulating varnish comprising said resin composition which has excellent compatibility with the enameled wires used in the machinery or appliance and is also capable of improving the reliability and performance of the machinery or appliance while shortening the time required for the insulation treatment.

Thus, this invention pertains to a light- and thermosetting resin composition comprising (a) an unsaturated epoxy ester having a resin acid value of 5 or less obtained by reacting a polyepoxide with an $\alpha,\beta$-unsaturated monobasic acid, (b) an $\alpha,\beta$-unsaturated ethylenic monomer, and (c) a photosensitizer and a peroxide. The invention also provides a light- and thermosetting resin composition comprising (a') a reaction product having a resin acid value of 5 or less obtained by reacting an unsaturated epoxy ester having a resin acid value above 5 with a monoepoxide, said unsaturated epoxy ester having been prepared by reacting a polyepoxide with an $\alpha,\beta$-unsaturated monobasic acid, (b) an $\alpha,\beta$-unsaturated ethylenic monomer and (c) a photosensitizer and a peroxide.

The present invention is also intended to provide a process for producing an electrical machinery or appliance which has been insulation-treated with said resin composition.

BRIEF DESCRIPTION OF THE DRAWINGS

In the accompanying drawings.

DESCRIPTION OF THE PREFERRED EMBODIMENTS

Figure 1:
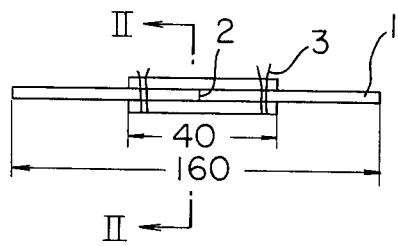
FIG. 1 is a schematic drawing of a test piece used for the measurement of adhesive strength under shear of an embodiment of this invention.

The component (a) or (a') in the resin composition of this invention is an unsaturated epoxy ester having a resin acid value of 5 or less, or a reaction product having a resin acid value of 5 or less obtained by reacting an unsaturated epoxy ester having a resin acid value of more than 5 with a monoepoxide.

An unsaturated epoxy ester having a resin acid value of 5 or less and an unsaturated epoxy ester having a resin acid value of greater than 5 can be obtained by reacting a polyepoxide with a substantially equivalent α,β-unsaturated monobasic acid. No specific conditions are imposed on the preparation of such unsaturated epoxy ester; it may be synthesized, for example, from a 100°–130° C. and 5- to 10-hour reaction by using a catalyst.

The unsaturated epoxy ester used as component (a) in the composition of this invention is selected from those having a resin acid value of 5 or less because use of an unsaturated epoxy ester with a resin acid value above 5 results in a poor compatibility with the enameled wires.

The resin acid value of the reaction product used as component (a'), obtained by reacting an unsaturated epoxy ester with a monoepoxide, is also defined to be 5 or less for the same reason.

An unsaturated epoxy ester having a resin acid value of 5 or less is synthesized by using a longer reaction time than for an unsaturated epoxy ester having a resin acid value above 5 in case the reaction temperature is the same. The resin acid number of said reaction product is also adjusted by the reaction time. Such resin acid value is measured in a known way by sampling out a part of the resin during the reaction.

The polyepoxide used in the present invention is a compound having one or more epoxy groups in the molecule. Examples of such compounds are the glycidyl polyethers of polyhydric alcohols or polyhydric phenols, epoxidized fatty acids or epoxidized drying oil fatty acids, epoxidized diolefins, epoxidized unsaturated diacid ester, epoxidized saturated acid esters and epoxidized saturated polyesters.

As the α,β-unsaturated monobasic acid, there may be used methacrylic acid, acrylic acid, crotonic acid and the like, and such acids may be used in combination.

As for the catalyst used in the reaction of this invention, there may be employed, for example, halides such as zinc chloride and lithium chloride, sulfides such as dimethyl sulfide and methylphenyl sulfide, sulfoxides such as dimethyl sulfoxide, methyl sulfoxide and methyl ethyl sulfoxide, tertiary amines such as N,N-dimethylaniline, pyridine, triethylamine and hexamethylenediamine or hydrochlorides or oxalates thereof, quaternary ammonium salts such as tetramethylammonium chloride and trimethyldodecylbenzylammonium chloride, sulfonic acids such as para-toluenesulfonic acid, and mercaptans such as ethyl mercaptan and propyl mercaptan.

Examples of the monoepoxides usable for the reaction with an unsaturated epoxy ester having a resin acid value of greater than 5 in this invention are the glycidyl ethers such as phenylglycidyl ether and butylglycidyl ether, and glycidyl esters such as glycidyl esters of para-t-butylbenzoic acids and monoglycidyl esters of fatty acids.

No specific restrictions are imposed on the reaction conditions, but said reaction materials are added in an amount such that the resin acid value of the reaction product would become 5 or less, such amount being naturally variable depending on the molecular weight of the monoepoxide used. For example, in case of reacting a phenylglycidyl ether or Cardura E (mfd. by Shell Chemical Co., epoxy equivalent weight: 240–250), which is a monoglycidyl ester of a fatty acid, with 100 parts by weight of an unsaturated epoxy ester having an acid value of around 15, said phenylglycidyl ether or Cardura E is added in an amount of 2.5–6 parts by weight or 4–10 parts by weight, respectively, and the reaction is conducted at 110°–120° C. for 2–3 hours so that the reaction product will have a resin acid value of 5 or less.

As the α,β-unsaturated ethylenic monomer used as component (b) in the composition of this invention, there may be employed styrene, vinyltoluene, ethylvinylbenzene, divinylbenzene, diallyl phthalate, α-methylstyrene, etc. acrylic or methacrylic esters such as 2-hydroxyethyl acrylate or 2-hydroxyethyl methacrylate, 1,6-hexanediol diacrylate or 1,6-hexanediol dimethyacrylate, trimethylolpropane triacrylate or trimethylolpropane trimethacrylate, polyethyleneglycol diacrylate or polyethyleneglycol dimethacrylate, etc., and these monomers may be used either singly or in combination. Preferably, such α,β-unsaturated ethylenic monomer, or the component (b), is used in an amount in the range of 70 to 30 parts by weight based on 30 to 70 parts by weight of the unsaturated epoxy ester or the reaction product of an unsaturated epoxy ester and a monoepoxide, or the component (a) or (a'), the total being 100 parts by weight.

As for the photosensitizer incorporated as the component (c) in the composition of this invention, there may be used the benzoin alkyl ethers such as benzoin, benzoin methyl ether, benzoin ethyl ether and benzoic isopropyl ether, acetophenones such as acetophenone, 2,2-dimethoxy-2-phenylacetophenone and 2,2-diethoxy-2-phenylacetophenone, benzoin-Michler's ketone, benzoin thioethers, benzophenones, anthraquinones, decyl chloride and the like. Such photosensitizer is preferably used in an amount in the range of 0.1 to 3% by weight based on the total amount of the unsaturated epoxy ester or the reaction product of an unsaturated epoxy ester and a monoepoxide and the α,β-unsaturated ethylenic monomer, that is, the sum of (a) or (a')+(b).

The peroxide used as additional component in the composition of this invention may be selected from the acyl peroxides such as benzoyl peroxide and acetyl peroxide, hydroperoxides such as tertiary-butyl peroxide and cumene hydroperoxide, ketone peroxides such as methyl ethyl ketone peroxide and cyclohexanone peroxide, diallyl peroxides such as di-tertiary-butyl peroxide and dicumyl peroxide, and oxyperoxides such as tertiary-butyl peroxyacetate. Such peroxide is preferably added in an amount of 0.5 to 3% by weight based on the total amount of the unsaturated epoxy ester (component (a)) or the reaction product of an unsaturated epoxy ester and a monoepoxide (component (a')) and the α,β-unsaturated ethylenic monomer (component (b)). If necessary, a metallic soap such as manganese naphthenate, lead naphthenate, cobalt naphthenate, cobalt octenoate or the like may be added as a curing accelerator. It is also possible to use an amine where necessary. As a polymerization inhibitor, there may be used hydroquinone, tertiary-butyl catechol, p-benzoquinone, 2,5-di-t-butylhydroquinone or the like.

Conventional processes may be applied for insulation treatment of an electrical machinery or appliance with the light- and thermosetting resin composition according to this invention. For instance, as is generally practiced, an electrical device is immersed in an insulating varnish and then pulled out, and the coated device surface is cured by light irradiation and then further heated to cure the uncured inside portion, or an insulating varnish is added dropwise to a rotating electrical device to coat it with said varnish and the coated surface is cured by light irradiation and then further heated to cure the uncured inside portion. The electrical device to be treated is usually preheated before subjected to coating with an insulating varnish, but such preheating itself and the conditions therefor are not critical.

Heating after curing by light irradiation is also not restricted to any specific means; it is possible to use any suitable means such as hot air, electricity, high frequency or far infrared rays.

The light- and thermosetting resin composition of this invention may be applied to a variety of electrical machinery and appliances the typical examples of which are stator and armature.

Shown below is an example of the process according to this invention.

A stator (coil wound, core dimensions: 140×110×35 mm) of a motor used at 100 V with an output of 125 W is preheated at 110°–130° C. for 30–60 minutes, then left in the air for 10–30 minutes and immersed for 2–5 minutes in a light- and thermosetting resin composition of this invention which has been worked to a viscosity of about 0.5–2.0 poises at 25° C. Then the stator is raised up, left in the air for 10–30 minutes and irradiated with the ultraviolet rays (using a high pressure mercury arc lamp) from a distance of 15–40 cm for a period of about 1–4 minutes to cure the surface, followed by further heating at 110°–130° C. for 15–30 minutes to complete curing, whereby an insulated stator can be produced.

The invention is further described hereinbelow by way of the examples thereof, in which all the "parts" are by weight unless otherwise noted.

COMPARATIVE EXAMPLE 1

376 parts of a diglycidyl ether of 4,4'-isopropylidenediphenol (Ep-828 mfd. by Shell Chemical Co., epoxy equivalent weight: 188), 172 parts of methacrylic acid, 2 parts of benzyldimethylamine and 0.05 part of hydroquinone were fed into a reaction vessel and reacted at 115° C. to synthesize an unsaturated epoxy ester (A) having a resin acid value of 16. By blending 45 parts of (A), 55 parts of styrene, 0.3 part of 6% cobalt octenoate and 1 part of benzoyl peroxide, there was prepared a resin composition (A-1).

Further, 2 parts of benzoin isopropyl ether was dissolved in 100 parts of said resin composition (A-1) to prepare a photosetting resin composition (A-2).

COMPARATIVE EXAMPLE 2

By using the same blend and same temperature condition as in COMPARATIVE EXAMPLE 1 but by changing the reaction time, there were prepared the unsaturated epoxy esters (B)–(D) having a resin acid value ranging from 7.6 to 3.1.

By blending 45 parts of each of the unsaturated epoxy esters having a resin acid value of 7.6 (B), 4.9 (C) and 3.1 (D), 55 parts of styrene, 0.3 part of cobalt octenoate (Co content: 6%) and 1 part of benzoyl peroxide, there were prepared the resin compositions (B-1)–(D-1).

EXAMPLE 1

2 parts of benzoin isopropyl ether was added to 100 parts of each of the resin compositions (C-1)–(D-1) of COMPARATIVE EXAMPLE 2 to make the resin compositions (C-2)–(D-2).

COMPARATIVE EXAMPLE 3

Unsaturated epoxy esters were synthesized by using the same blend and same synthetic process as in COMPARATIVE EXAMPLE 1, and when the resin acid value has reached 17, 35 parts of Cardura E was added and the reaction was further continued at 115° C. to synthesize a product having a resin acid value of 9.0 (E), a product having a resin acid value of 6.2 (F) and a product having a resin acid value of 4.6 (G). By blending 45 parts of each of said products (E)–(G), 55 parts of styrene, 0.3 part of 6% cobalt octenoate and 1 part of benzoyl peroxide, there were prepared the resin compositions (E-1)–(G-1).

EXAMPLE 2

2 parts of benzoin isopropyl ether was added to 100 parts of each of the resin compositions (E-1)–(G-1) of COMPARATIVE EXAMPLE 3 to form the resin compositions (E-2)–(G-2).

Each of the resin compositions (A-2), (B-2), (C-2), (D-2), (E-2), (F-2) and (G-2) obtained in EXAMPLES 1 and 2 and COMPARATIVE EXAMPLES 1 and 2 was irradiated with ultraviolet rays for 3 minutes and then heated at 120° C. for 20 minutes. The properties of these preparations as an insulating varnish were examined and compared.

The following test was also conducted on each of said preparations. The single-phase, 125 W stators (core dimensions: 140×110×25 mm) using PEW with a diameter of 0.6 mm were preheated at 120° C. for 30 minutes and then left at room temperature for 15 minutes. These stators were immersed in each of the resin compositions obtained in said EXAMPLES and COMPARATIVE EXAMPLES for one minute, then taken out of the immersion bath and left at room temperature for 5 minutes. Thereafter, some of them were subjected to heating at 120° C. (COMPARATIVE EXAMPLES 1–3), some others to irradiation with ultraviolet rays for 3 minutes (COMPARATIVE EXAMPLES 2–3) and others to irradiation with ultraviolet rays for 3 minutes and further heating at 120° C. (EXAMPLES 1–2), and the curing characteristics, compatibility with enameled wires, crack resistance and other properties of the thus treated respective stators were examined and compared. The results are shown in Tables 1 and 2.

Ultraviolet ray irradiation conditions

Lamp: 1 KW high pressure mercury arc lamp, ORC AHH-1000, mfd. by ORC Seisakusho, Ltd., two lamps used.
Irradiation distance: 20 cm
Irradiation time: 3 minutes

TABLE 1

| | Examples | | | | | | | |
|---|---|---|---|---|---|---|---|---|
| | Comparative Example 1 | | Comparative Example 2 | Example 1 | | | Comparative Example 2 | |
| Resin composition | A-1 | A-2 | B-2 | C-2 | D-2 | B-1 | C-1 | D-1 |
| Resin acid value of unsaturated epoxy ester | 16 | 16 | 7.6 | 4.9 | 3.1 | 7.6 | 4.9 | 3.1 |
| Properties of varnish and | | | | | | | | |

TABLE 1-continued

| | Examples | | | | | | | |
|---|---|---|---|---|---|---|---|---|
| | Comparative Example 1 | Comparative Example 2 | Example 1 | | | Comparative Example 2 | | |
| Resin composition | A-1 | A-2 | B-2 | C-2 | D-2 | B-1 | C-1 | D-1 |
| cured products | | | | | | | | |
| Viscosity (poises, 25° C.) | 0.45 | 0.45 | 0.45 | 0.42 | 0.46 | 0.45 | 0.43 | 0.44 |
| Compatibility with styrene | Δ | Δ | Δ | Δ | Δ | Δ | Δ | Δ |
| Varnish stability (change with time (days)) | x | x | o | o | o | o | o | o |
| Surface curing time | 20 min. (120° C.) | 0.5 min. (35° C., UV) | 0.5 min. (35° C., UV) | 0.5 min. (35° C., UV) | 0.5 min. (35° C., UV) | 20 min. (120° C.) | 20 min. (120° C.) | 20 min. (120° C.) |
| Monomer escape (% by weight) | 29.2 | 7.0 | 7.2 | 6.9 | 7.3 | 28.6 | 28.5 | 28.5 |
| Adhesive strength under shear (23° C., kgf) | 55 | 62 | 65 | 63 | 63 | 56 | 56 | 58 |
| Compatibility with PEW in model coil | | | | | | | | |
| (PEW-1*) | Δ-x | Δ | o | o | o | o-Δ | o | o |
| (PEW-2*) | x | x | o-Δ | o | o | Δ | o-Δ | o |
| Test piece making conditions | 120° C./ 2 hr. | | UV/3 min. + 120° C./20 min. | | | 120° C./ 2 hr. | 120° C./ 2 hr. | 120° C./ 2 hr. |
| Properties of test appliance | | | | | | | | |
| Curing time | 120° C./ 50 min. | UV/3 min. + 120° C./ 17 min. | UV/3 min. + 120° C./ 17 min. | UV/3 min. + 120° C./ 17 min. | UV/3 min. + 120° C./ 17 min. | 120° C./ 50 min. | 120° C./ 50 min. | 120° C./ 50 min. |
| Compatibility with enameled wire after curing | | | | | | | | |
| (External appearance) | x | x-Δ | o-Δ | o | o | Δ | o-Δ | o |
| (BDV**) | x | x-Δ | o-Δ | o | o | Δ | o-Δ | o |
| Crack resistance temp. (°C.) at which crack developed) | −50 | −40 | −50 | −50 | −50 | −50 | −50 | −50 |
| Test appliance (125 W stator) curing conditions | 120° C./ 2 hr. | | UV/3 min. + 120° C./20 min. | | | 120° C./ 2 hr. | 120° C./ 2 hr. | 120° C./ 2 hr. |

(Notes) "UV" in the table is an abbreviation of "ultra-violet rays".
*: Test wire made by Hitachi Chemical Co., Ltd., baked in a vertical stove: stove temp., 300° C. (inlet); 250° C. (center), 400° C. (outlet); stove length, 4.5 m; coating method, 7 times of die coating; baking rate; 9 m/min for PEW-1 and 11 m/min for PEW-2.
**: "BDV" is an abbreviation of dielectric breakdown voltage.

TABLE 2

| | Examples | | | | | | | |
|---|---|---|---|---|---|---|---|---|
| | Comparative Example 1 | | Comparative Example 3 | | | Comparative Example 3 | | Example 2 |
| Resin composition | A-1 | A-2 | E-1 | F-1 | G-1 | E-2 | F-2 | G-2 |
| Resin acid value of unsaturated Resin Acid Value of: | 16 | 16 | 17 | 17 | 17 | | | |
| (1) Unsaturated epoxy resin | — | — | 9.0 | 6.2 | 4.6 | 9.0 | 6.2 | 4.6 |
| (2) Reaction product of the epoxy resin and a monoepoxide | — | — | | | | | | |
| Properties of varnish and cured products | | | | | | | | |
| Viscosity | 0.45 | 0.45 | 0.41 | 0.42 | 0.43 | 0.42 | 0.42 | 0.43 |
| Compatibility with styrene | Δ | Δ | o | o | o | o | o | o |
| Varnish stability (change with time (days)) | x | x | o | o | o | o | o | o |
| Surface curing time | 20 min. (120° C.) | 0.5 min. (35° C., UV) | 20 min. (120° C.) | 20 min. (120° C.) | 20 min. (120° C.) | 0.5 min. (35° C., UV) | 0.5 min. (35° C., UV) | 0.5 min. (35° C., UV) |
| Monomer escape (% by weight) | 29.2 | 7.0 | 29.0 | 28.0 | 27.8 | 7.0 | 7.0 | 6.9 |
| Adhesive strength under shear (23° C., kgf) | 55 | 62 | 56 | 56 | 56 | 64 | 64 | 63 |
| Compatability with PEW in model coil | | | | | | | | |
| (PEW-1) | Δ-x | Δ | o-Δ | o | o | o | o | o |
| (PEW-2) | x | x | Δ | Δ | o-Δ | o-Δ | o-Δ | o |
| Test piece making conditions | 120° C./ 2 hr. | UV/3 min. + 120° C./ 20 min. | 120° C./ 2 hr. | 120° C./ 2 hr. | 120° C./ 2 hr. | UV/3 min. + 120° C./20 min. | | |
| Properties of test appliance | | | | | | | | |
| Curing time | 120° C./ 50 min. | UV/3 min. + 120° C./ 17 min. | 120° C./ 50 min. | 120° C./ 50 min. | 120° C. 50 min. | UV/3 min. + 120° C./ 17 min. | UV/3 min. + 120° C./ 17 min. | UV/3 min. + 120° C. 17 min. |
| Compatibility with enameled wires | | | | | | | | |

TABLE 2-continued

| | Examples | | | | | | | |
|---|---|---|---|---|---|---|---|---|
| | Comparative Example 1 | | Comparative Example 3 | | | Comparative Example 3 | | Example 2 |
| Resin composition | A-1 | A-2 | E-1 | F-1 | G-1 | E-2 | F-2 | G-2 |
| (External appearance) | x | x–Δ | Δ | Δ | o–Δ | o–Δ | o–Δ | o |
| (BDV) | x | x–Δ | Δ | Δ | o–Δ | o–Δ | o–Δ | o |
| Crack resistance (temp. (°C.) at which crack developed) | −50 | −40 | −50 | −50 | −50 | −50 | −50 | −50 |
| Test appliance (125 W stator) curing conditions | 120° C./ 2 hr. | UV/3 min. + 120° C./ 2 hr. | 120° C./ 2 hr. | 120° C./ 2 hr. | 120° C./ 2 hr. | UV/3 min. + 120° C./20 min. | | |

Test method (1) Compatibility with styrene

Each test resin composition was put into a test tube having a diameter of 18 mm to a height of 180 mm, and after sealing the test tube, it was left at 0° C. for 5 days and then the external appearance of the resin composition was observed.

Evaluation:
o: No change in external appearance, and good compatibility.
Δ: Opaque in external appearance, and somewhat poor compatibility.
x: Phase separation observed, and poor compatibility.

(2) Varnish stability (change with time (days))

Each test resin composition (300 g) was put into a 300 cc tin-made round can and left at 40° C. for 10 days, and then the external appearance of the resin composition was observed.

Evaluation:
o: No change in external appearance.
Δ: Precipitate was produced slightly.

(3) Surface curing characteristics

Each test resin composition was coated on a 18×5×0.25 tmm tin plate and the coated surface was irradiated with ultraviolet rays or heated at 120° C., and then the time required till curing of the surface was measured.

(4) Monomer escape

Each test resin composition (10 g) was put into a 60φ×12 mm metal-made laboratory dish, and then it was either heated at 120° C. for 2 hours or irradiated with ultraviolet rays for 3 minutes and then further heated at 120° C. for 20 minutes, and for either of said cases, the amount of monomer escape was determined from the difference in mass between before curing and after curing.

(5) Adhesive strength under shear

Figure 2:
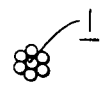
FIG. 2 is a sectional view of a butt-joined portion of an enameled wire.

A test piece made with 2.0φ (2.0 mm diameter) PEW-1 shown in FIGS. 1 and 2 according to JIS-C-2105 was impregnated and coated with each test resin composition and then it was either heated at 120° C. for 2 hours or irradiated with ultraviolet rays for 3 minutes and further heated at 120° C. for 20 minutes, and the adhesive strength under shear was measured at 23° C. for either of said cases.

In FIGS. 1 and 2, reference numeral 1 indicates a 2.0 mm diameter PEW, 2 a butt-joined portion, and 3 an enameled wire. The unit for each figure is mm.

(6) Compatibility with PEW in model coil

Figure 3:
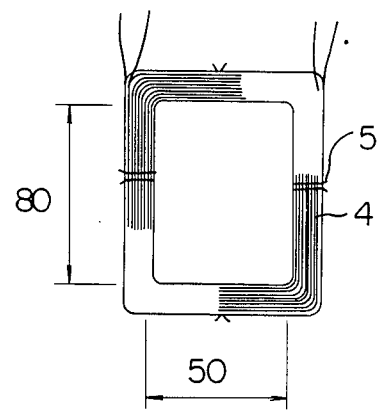
FIG. 3 is a schematic drawing of a model coil used in the compatibility test with PEW in an embodiment of this invention.

A 30-turn parallel-wound model coil, such as shown in FIG. 3, was formed by using 0.8φ PEW-1 (line speed: 9 m/min) and PEW-2 (line speed: 11 m/min) which had been baked in a vertical stove (stove length: 4.5 m; passed through die 7 times; stove temperature: 300° C. at bottom portion, 350° C. at center and 400° C. at top portion) by changing the baking speed, and this model coil was treated with each test resin composition and then it was either heated at 120° C. for 20 minutes or irradiated with ultraviolet rays for 3 minutes and further heated at 120° C. for 20 minutes, and the external appearance of the PEW coating was observed and also the dielectric breakdown voltage (BDV) between wires was measured for each of said cases.

Evaluation:
o: No abnormality in external appearance, BDV: 10–12 KV.
o–Δ: Slight swelling was seen partly, BDV: 10–12 KV.
Δ: Swelling was formed, BDV: 7–10 KV.
x: Large and extensive swelling was produced, BDV: 2–5 KV.

In FIG. 3, reference numeral 4 indicates 0.8φ PEW and 5 cotton yarn. The unit of each figure is mm.

(7) Curing time

A 125 W stator was immersed in and coated with each test resin composition and then it was either heated at 120° C. or irradiated with ultraviolet rays for 3 minutes and then further heated at 120° C. and the curing characteristic of the resin composition was judged from insulation resistance between the stator wires for each of said cases. The time in which insulation resistance has reached saturation was given as curing time.

(8) Compatibility with enameled wire after curing

A 125 W stator was immersed in and coated with each test resin composition and then it was either heated at 120° C. for 2 hours or irradiated with ultraviolet rays for 3 minutes and further heated at 120° C. for 20 minutes, and observation of external appearance of the PEW coating and measurement of BDV between wires were conducted for each of said cases.

Evaluation: (External appearance)
o: No peel and no swelling.
Δ: Slight swelling occured partly.
x: Swelling prevailed.
(BDV)
o: 10–12 KV  Δ: 7–10 KV  x: 2–5 KV.

(9) Crack resistance

A 125 W stator cured in the same way as in (8) above was subjected to 5 times of heat cycle (left at 25° C. for 1 hour⟵⟶left at low temperature for 1 hour), and in case no crack developed in the cured varnish coating, the low temperature side was further reduced by 10° C. at one time and the similar heat cycle was conducted to confirm the crack developing temperature.

The results of Tables 1 and 2 show that light irradiation and heat-curing of the coating with a light- and thermosetting resin composition according to this invention can reduce the curing time for the insulation treatment to about 1/2.5 of the case of heat-curing and can also improve the compatibility with the enameled wires, thus allowing production of the electrical machinery and appliances with high reliability.

What is claimed is:

1. A light- and thermosetting resin composition which comprises
   (a) 30 to 70 parts by weight an unsaturated epoxy ester having a resin acid value of 5 or less obtained by reacting a polyepoxide with an α,β-unsaturated monobasic acid, or
   a reaction product having a resin acid value of 5 or less obtained by reacting an unsaturated epoxy ester having a resin acid value of more than 5, said unsaturated epoxy ester having been prepared by reacting a polyepoxide with an α,β-unsaturated monobasic acid, with a monoepoxide,
   (b) 70 to 30 parts by weight of at least one α,β-unsaturated ethylenic monomer the total of component (a) and component (b) being 100 parts by weight, said monomer being selected from the group consisting of styrene, vinyltoluene, ethylvinylbenzene, divinylbenzene, diallyl phthalate, α-methylstyrene, 2-hydroxyethyl acrylate, 2-hydroxyethyl methacrylate, 1,6-hexanediol diacrylate, 1-6-hexanediol dimethylacrylate, trimethylolpropane triacrylate, trimethylolpropane trimethacrylate, polyethyleneglycol diacrylate and polyethyleneglycol dimethacrylate, and
   (c) 0.1 to 3% by weight of at least one photosensitizer and 0.5 to 3% by weight of at least one peroxide based on the total weight of components (a) and (b).

2. A composition according to claim 1, wherein the component (a) is an unsaturated epoxy ester having a resin acid value of 5 or less obtained by reacting a polyepoxide with an α,β-unsaturated monobasic acid.

3. A composition according to claim 1, wherein the component (a) is a reaction product having a resin acid value of 5 or less obtained by reacting an unsaturated epoxy ester having a resin acid value of more than 5, said unsaturated epoxy ester having been prepared by reacting a polyepoxide with an α,β-unsaturated monobasic acid, with a monoepoxide.

4. A composition according to claim 1, wherein the polyepoxide is a compound having at least one epoxy group in the molecule.

5. A composition according to claim 4, wherein the polyepoxide is a glycidyl polyether of a polyhydric alcohol or a polyhydric phenol, an epoxidized fatty acid or an epoxidized drying oil fatty acid, an epoxidized diolefin, an epoxidized unsaturated diacid ester, an epoxidized saturated acid ester, or an epoxidized saturated polyester.

6. A composition according to claim 1, wherein the α,β-unsaturated monobasic acid is methacrylic acid, acrylic acid or crotonic acid.

7. A composition according to claim 3, wherein the monoepoxide is a butylglycidyl ether, phenylglycidyl ether, a glycidyl ester of para-t-butylbenzoic acid or a monoglycidyl ester of fatty acid.

8. In a process for producing an insulated electrical machinery or appliance by coating with a resin composition, the improvement wherein as the resin composition there is used the resin composition of claim 1.

9. A process according to claim 8, wherein the resin composition is the resin composition of claim 2.

10. A process according to claim 8, wherein the resin composition is the resin composition of claim 3.

11. A process according to claim 8, wherein the electrical machinery or appliance is a stator.

12. A process according to claim 8, wherein the electrical machinery or appliance is an armature.

13. A composition according to claim 1, wherein the photosensitizer is a member selected from the group consisting of benzoin, benzoin methyl ether, benzoin ethyl ether, benzoic isopropyl ether, acetophenone, 2,2-dimethoxy-2-phenylacetophenone, 2,2-diethoxy-2-phenylacetophenone, benzoin-Michler's ketone, a benzoin thioether, a benzophenone, an anthraquinone and decyl choride and the peroxide is a member selected from the group consisting of benzoyl peroxide, acetyl peroxide, tertiary-butyl peroxide, cumene hydroperoxide, methyl ethyl ketone peroxide, cyclohexanone peroxide, di-tertiary-butyl peroxide, dicumyl peroxide and tertiary-butyl peroxyacetate.

* * * * *